US 7,623,757 B2

(12) United States Patent
Watanabe et al.

(10) Patent No.: US 7,623,757 B2
(45) Date of Patent: Nov. 24, 2009

(54) REMOTE CONTROL DEVICE FOR RECORDING/REPRODUCING APPARATUS AND VIDEO SIGNAL RECORDING/REPRODUCING APPARATUS

(75) Inventors: Jun Watanabe, Kanagawa (JP); Toshiyuki Katsumoto, Tokyo (JP); Natsuo Ito, Kanagawa (JP); Shunsuke Kunieda, Tokyo (JP); Shigeki Yamamoto, Kanagawa (JP); Kae Nagano, Tokyo (JP); Yukinori Kita, Tokyo (JP); Hiroyuki Yoshizu, Kanagawa (JP); Hideki Toshikage, Saitama (JP)

(73) Assignee: Sony Corporation, Tokyo (JP)

( * ) Notice: Subject to any disclaimer, the term of this patent is extended or adjusted under 35 U.S.C. 154(b) by 1545 days.

(21) Appl. No.: 09/905,063

(22) Filed: Jul. 13, 2001

(65) Prior Publication Data

US 2002/0031328 A1    Mar. 14, 2002

(30) Foreign Application Priority Data

Jul. 14, 2000    (JP)    ............................. 2000-214745
Jul. 14, 2000    (JP)    ............................. 2000-214746

(51) Int. Cl.
*H04N 5/445*    (2006.01)
*H04N 5/91*    (2006.01)
*G06F 3/00*    (2006.01)
(52) U.S. Cl. ........................... 386/83; 725/58; 715/721; 715/723
(58) Field of Classification Search .................. 386/46, 386/83, 95, 52, 55, 125, 126, 68, 69, 70; 725/37, 39, 58; 715/719–721, 723–725; 707/104.1
See application file for complete search history.

(56) References Cited

U.S. PATENT DOCUMENTS

| 5,479,266 | A | * | 12/1995 | Young et al. | .................. | 386/83 |
| 5,689,484 | A | * | 11/1997 | Hirasawa | .................. | 369/30.3 |
| 5,963,264 | A |   | 10/1999 | Jackson | | |
| 6,181,870 | B1 | * | 1/2001 | Okada et al. | .................. | 386/95 |
| 6,366,296 | B1 | * | 4/2002 | Boreczky et al. | ............ | 715/719 |
| 6,480,669 | B1 | * | 11/2002 | Tsumagari et al. | ............ | 386/95 |
| 6,574,609 | B1 | * | 6/2003 | Downs et al. | ................ | 705/50 |

(Continued)

FOREIGN PATENT DOCUMENTS

EP    0 764 951    3/1997

(Continued)

*Primary Examiner*—Vincent Boccio
(74) *Attorney, Agent, or Firm*—Frommer Lawrence & Haug LLP; William S. Frommer; Ellen Marcie Emas (57) ABSTRACT

It aims to make it possible to simultaneously record and reproduce a video signal and improve convenience of operation. A video recording/reproducing apparatus capable of recording an image into a recording medium and reproducing the image from the recording medium, comprising: a recording means for recording video signals and identifying signals indicating the content of the video signals into a recording medium; a displaying means for reading the identifying signals recorded in the recording medium (93), rearranging the read identifying signals, and displaying the identifying signals in the order of the rearrangement; and a reproducing means for sequentially reproducing the video signals from the recording medium (93) in the order of the rearrangement, in which whether there exists a video signal under recording in the recording medium (93) is checked and at completion of the recording of the video signal, video signals to be reproduced are sequentially reproduced.

12 Claims, 7 Drawing Sheets

U.S. PATENT DOCUMENTS 6,710,785 B1 * 3/2004 Asai et al. .................. 715/723

FOREIGN PATENT DOCUMENTS

| EP | 0 929 197 | 7/1999 |
| GB | 2 329 997 | 4/1999 |
| WO | WO 92/22983 | * 12/1992 |
| WO | WO 92 22983 | 12/1992 |

* cited by examiner

REMOTE CONTROL DEVICE FOR RECORDING/REPRODUCING APPARATUS AND VIDEO SIGNAL RECORDING/REPRODUCING APPARATUS

BACKGROUND OF THE INVENTION

1. Field of the Invention

The present invention relates to a remote control device for a recording/reproducing apparatus and a video signal recording/reproducing apparatus for use in recording and reproducing broadcast, and more particularly to that one using a hard disk or an optical disk as a recording medium.

2. Description of the Related Art

Generally, A recording/reproducing apparatus using a video tape is well known. The recording/reproducing apparatus using a video tape, however, are impossible to freely perform reproduction while performing recording in a time sharing way by instantly switching between the recording and reproducing.

Recording devices by a personal computer using a general hard disk and such software are on the market. They are, however, not recording/reproducing devices for the exclusive use, and therefore they cannot perform simultaneous recording and reproducing.

Since a man-machine interface premised on the simultaneous recording and reproducing is not adopted there due to the above apparatus being unable to simultaneously record and reproduce, the conventional tube face displays and switching operation for setting cannot provide an optimum operational environment for recording/reproducing devices capable of simultaneous recording and reproducing.

The conventional video recording/reproducing apparatus cannot perform simultaneous recording and reproducing. Assuming that this simultaneous recording and reproducing is possible, for example, considering that all the recorded video signals are to be reproduced, a video signal that is being recorded must be also reproduced. Heretofore, such a playback has not been considered.

In the simultaneous recording and reproducing, since the position or the time of the final image of a video signal is not clear, the last one of the recorded images cannot be recognized and the procedure for reproducing the next video signal to be reproduced cannot be taken. Therefore, it is impossible to program reproduction of the next reproduced image after completion of the playback of the video signal being recorded.

SUMMARY OF THE INVENTION

The present invention aims to provide a video recording/reproducing apparatus capable of simultaneously recording and reproducing video signals, which has been impossible with the conventional video recording/reproducing apparatus. More particularly, the present invention aims to provide a video recording/reproducing apparatus capable of simultaneous recording and reproducing, in which a playback of another video signal can be resumed while reproducing a video signal under simultaneous recording and reproducing and at completion of the reproducing thereof.

Further, since there are recording display and playback display on the same tube face, it is difficult to discriminate the recording and the playback at first sight.

Since the conventional video recording/reproducing apparatus and remote control device (remote control) doesn't adopt an optimum structure and optimum arrangement and display of switches, for a video recording/reproducing apparatus capable of simultaneous recording and reproducing by means of a hard disk or an optical disk, there is a possibility of stopping the recording of an image by mistake when stopping the playback of an image being recorded.

The present invention aims to provide a man-machine interface improved in display on tube face and switching operation for recording and reproducing, better than the conventional video recording/reproducing apparatus as mentioned above.

Assuming that simultaneous recording and reproducing are possible and displayed on the same tube face, the conventional recording/reproducing apparatus will show the recording and reproducing display on the same tube face, which makes it difficult to distinguish at first sight between the recording display and the reproducing display.

Further, the conventional recording/reproducing apparatus and remote controlling device (remote control) are not optimally structured for a recording/reproducing apparatus capable of simultaneous recording and reproducing by using a hard disk or an optical disk and lack an optimum arrangement and display of switches. Therefore, there is a possibility of stopping recording pictures by mistake when stopping playback of video being reproduced.

An object of the present invention is to provide a man-machine interface related to the display on a tube face which is yet to be provided and switching operation for recording and playback, etc., better than the conventional recording/reproducing apparatus as mentioned above.

Another object of the present invention is to provide a new remote control.

Further another object of the present invention is to provide such a new tube face display enabling an operator's easy operation at a time of simultaneously recording and reproducing.

The present invention aims to provide a man-machine interface improved in display on tube face and switching operation for recording and reproducing, better than the conventional video recording/reproducing apparatus as mentioned above.

Assuming that simultaneous recording and reproducing are possible and displayed on the same tube face, the conventional recording/reproducing apparatus will show the recording and reproducing display on the same tube face, which makes it difficult to distinguish at first sight between the recording display and the reproducing display.

Further, the conventional recording/reproducing apparatus and remote controlling device (remote control) are not optimally structured for a recording/reproducing apparatus capable of simultaneous recording and reproducing by using a hard disk or an optical disk and lack an optimum arrangement and display of switches. Therefore, there is a possibility of stopping recording pictures by mistake when stopping playback of video being reproduced.

An object of the present invention is to provide a man-machine interface related to the display on a tube face which is yet to be provided and switching operation for recording and playback, etc., better than the conventional recording/reproducing apparatus as mentioned above.

Another object of the present invention is to provide a new remote control.

Further another object of the present invention is to provide such a new tube face display enabling an operator's easy operation at a time of simultaneously recording and reproducing.

A video recording/reproducing apparatus of the present invention, capable of recording an image into a recording medium and reproducing the image from the recording medium, comprises: a recording device for recording video signals and identifying signals indicating the content of the video signals into a recording medium, and a displaying device for reading the identifying signals recorded in the recording medium, rearranging the read identifying signals, and displaying the identifying signals in the order of the rearrangement, and a reproducing device for sequentially reproducing the video signals from the recording medium in the order of the rearrangement, in which whether there exists a video signal under recording in the recording medium is checked and at completion of the recording of the video signal, video signals to be reproduced are sequentially reproduced.

A video signal recording/reproducing method of the present invention, capable of recording an image into a recording medium and reproducing the image from the recording medium, comprises the following steps of: recording video signals and identifying signals indicating the content of the video signals into a recording medium, and reading the identifying signals recorded in the recording medium; rearranging the read identifying signals, and displaying the identifying signals in the order of the rearrangement; checking whether there exists a video signal under recording in the recording medium; and reproducing the video signals in the order of the rearrangement when there exists no video signal under recording.

A video recording/reproducing apparatus of the present invention, capable of recording an image into a recording medium and reproducing the image from the recording medium, comprises: a recording device for recording video signals and identifying signals indicating the content of the video signals into a recording medium, and a displaying device for reading the identifying signals recorded in the recording medium, rearranging the read identifying signals, and displaying the identifying signals in the order of the rearrangement, and a reproducing device for sequentially reproducing the video signals from the recording medium in the order of the rearrangement, in which whether there exists a video signal under recording in the recording medium is checked and at completion of the recording of the video signal, video signals to be reproduced are sequentially reproduced.

A video signal recording/reproducing method of the present invention, capable of recording an image into a recording medium and reproducing the image from the recording medium, comprises the following steps of: recording video signals and identifying signals indicating the content of the video signals into a recording medium, and reading the identifying signals recorded in the recording medium; rearranging the read identifying signals, and displaying the identifying signals in the order of the rearrangement; checking whether there exists a video signal under recording in the recording medium; and reproducing the video signals in the order of the rearrangement when there exists no video signal under recording.

A remote control device for a recording/reproducing apparatus according to the present invention is used for a recording/reproducing apparatus capable of recording an image into a recording medium and reproducing the image from the recording medium, in which a recording stop switch for stopping recording video signals and a playback stop switch for stopping playback, provided on a first surface of the remote control device itself, are separated.

A video recording/reproducing apparatus of the present invention, capable of recording an image into a recording medium and reproducing the image from the recording medium, comprises: a recording device for recording video signals and identifying signals indicating the content of the video signals into a recording medium, and a displaying device for reading the identifying signals recorded in the recording medium, rearranging the read identifying signals, and displaying the identifying signals in the order of the rearrangement, and a reproducing device for sequentially reproducing the video signals from the recording medium in the order of the rearrangement, in which whether there exists a video signal under recording in the recording medium is checked and at completion of the recording of the video signal, video signals to be reproduced are sequentially reproduced.

DESCRIPTION OF THE PREFERRED EMBODIMENTS

Hereinafter, an embodiment of the present invention will be described in detail with reference to the drawings.

Figure 1:
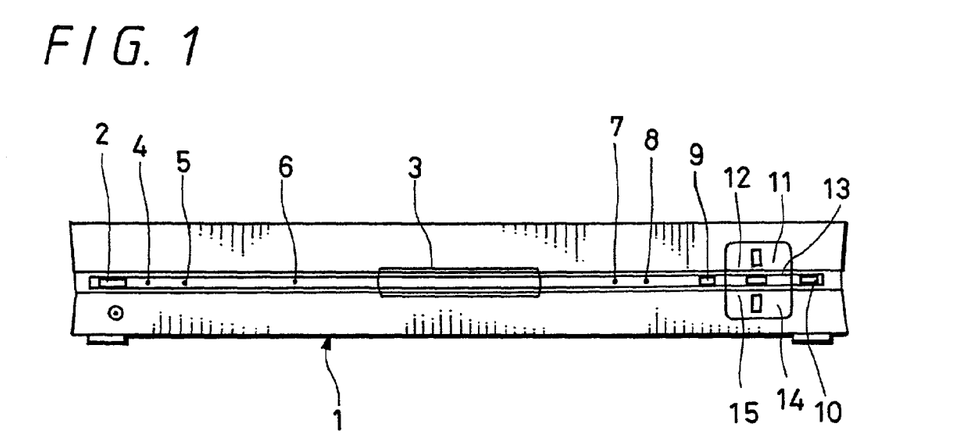
FIG. 1 is a front view showing an example of an embodiment of a video signal recording/reproducing apparatus of the present invention.

FIG. 1 is a front view showing the appearance of a video signal recording/reproducing apparatus of the embodiment. A video signal recording/reproducing apparatus itself 1 has a main power switch 2 on the front surface, and a front lamp 3, lighting up when the power source of the apparatus is turned on, is to show the power-on/off of the apparatus.

Although the conventional video signal recording/reproducing apparatus adopts a display unit which shows the reproducing state and the playback state by a counter, the counter display itself is not suitable in the simultaneous recording/reproducing apparatus using a hard disk and an optical disk as a recording medium, as described later, and it is replaced with the tube face display. If showing the power-on/off by a lamp of 5 mm diameter, LED, or the like in the conventional way, an operator may confuse it with another lamp or LED, and therefore, use of a lamp on the front surface of the apparatus, long in the longitudinal direction, having a wide illumination area, can prevent the confusion of the lamp with another lamp.

On the front surface of the main body 1, there are a programmed record lamp 4 showing the setting state of the recording by a timer, namely the setting state of the programmed recording, and a program playback display lamp 5 showing that at a time of dubbing video, sound, and the other information recorded in other recording media such as a tape, a semiconductor memory and the like, video, sound, and the other information recorded in a recording medium within the main body are to be reproduced after deciding on a predetermined playback procedure.

This program playback lamp 5 indicates that only a switch used for stopping the playback is workable, of the switches related to the playback of the record, provided on the main body 1 and the remote controller 30 to be described later on.

On the front surface of the main body 1, there are a synchro record button 6 for performing programmed synchro recording with a CS digital broadcast tuner, a tool button 7 for recording, reproducing, and various setting by using the tube face of a monitor and a TV connected to this main body 1, a back button 8, a menu button 9, a list button 10, and common buttons 11, 12, 13, 14, and 15. The common buttons 11, 12, 13, and 14 are used in vertically and horizontally moving a cursor displayed on the tube face, and further they are used for a pause, fast return, fast forward, and stop, of the playback. The common button 15 is used for directing playback and further it is used as a decision button in deciding various setting on the tube face menu.

Figure 2:
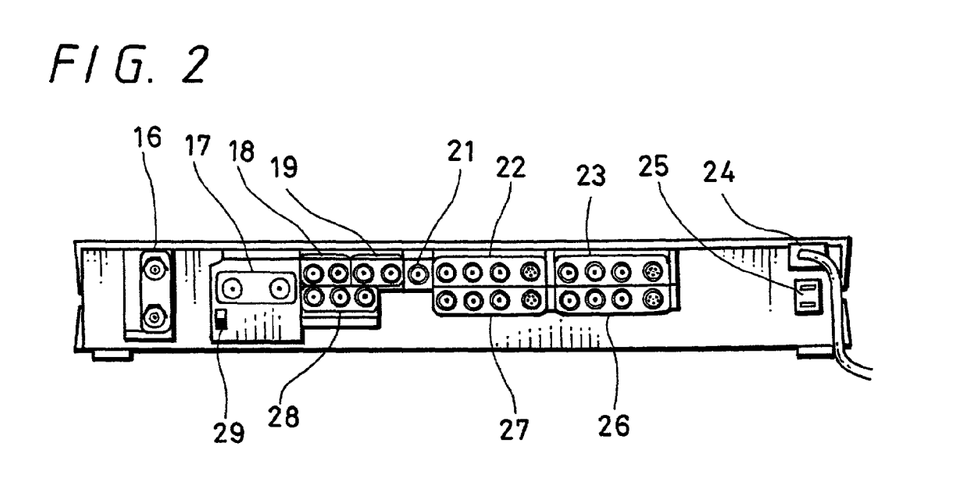
FIG. 2 is a rear view of FIG. 1.

FIG. 2 is a view showing the rear surface of this main body 1, including a line cord 24 and an outlet 25 for power supply to the other equipment, and further including a VHF/UHF input/output terminal 16 for connecting to an antenna and a TV and a BS-IF input/output terminal 17 used in combination with the VHF/UHF input/output terminal 16 by a branching filter when the antenna is common to VHF/UHF/BS.

Further, the rear surface includes a bit stream input/output terminal 19 and a detection input/output terminal 18 for use in connecting to a BS decoder. This detection input/output terminal 18 is used for connecting a MUSE-NTSC converter together with a decoder AFC input/output terminal 21 and a decoder input terminal 28. Further a converter power switch 29 for turning on/off the power supply to a converter is provided adjacently to it.

It includes input terminals 22 and 27 and output terminals 23 and 26 used for input/output of audio signals and video signals.

Figure 3:
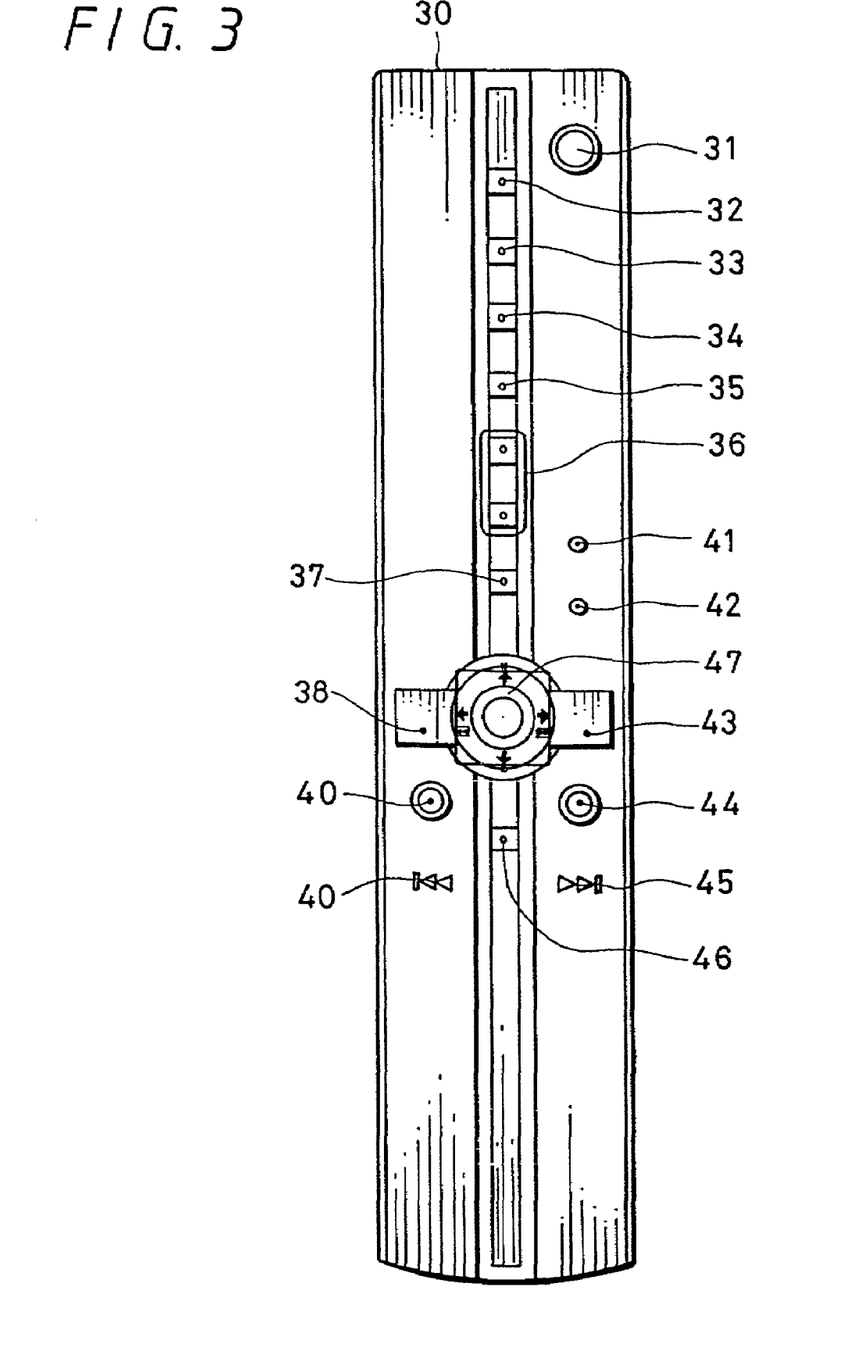
FIG. 3 is a top view showing an example of an embodiment of a remote control device of the recording/reproducing apparatus of the present invention.

FIG. 3 shows the top surface of the remote control 30 used for a remote operation, including a power switch 31 for turning on/off the power of the video signal recording/reproducing apparatus itself 1. The power switches 2 and 31 are set so as to turn on/off only a circuit for use in a man-machine interface.

On the front surface of this remote controller 30, there are a record button 32, a pause button 33, a stop button 34, a recording monitor button 35, a button 41 for screen display and indicating the remaining, and a visual search button 42, for use in recording, which are not provided on the main body 1.

Further, on the front surface of the remote control 30, apart from the above-mentioned buttons, there are a menu button 38, a back button 39, a list button 43, and a tool button 44 respectively having the same function as that of each button provided on the main body 1, and a joystick 47 having the same function as that of the buttons 11, 12, 13, 14, and 15 provided on the main body 1. The joystick is used for vertically and horizontally moving a cursor displayed on the screen by pressing in some operational direction and it is also used for pause, fast return, fast forward, and stop of the playback. The common button 15 is used to direct a playback and to determine various settings on the screen.

A program description button 46 is disposed in the remote control 30 at a position opposite the buttons related to the recording, in the longitudinal direction.

Since the main body 1 is capable of the simultaneous recording and reproducing, the button group related to the recording, in the recording/reproducing apparatus, is disposed at a position different from that of the button group related to the playback on the front surface of the remote control and the both positions are separated, thereby enabling the accurate operation of the recording and the playback. On the other hand, in the conventional recording/reproducing device, for example, a record button and a playback button are disposed adjacently to each other, and this arrangement of the buttons may cause a malfunction when simultaneously operating the record and the playback.

In the remote control 30 of this embodiment, not only the positional relationship of the operation buttons but also the switching mechanism is changed, like the buttons 32, 33, 34, and 35 and the joystick 47, thereby making the operation distinguishable, as well as improving the man-machine interface performance by adopting the joystick mechanism as to the playback function requiring the accurate operation.

As for an instance access, of the functions used for reproducing, no operational ease is needed. Therefore, the buttons 40 and 46 are used for this, and the menu button 38, the back button 39, the list button 43, and the tool button 44 related to the playback function are disposed adjacently to the joystick 47.

On the front surface of the remote controller 30, further there are a channel setting button 36, a quick-view button 37, the screen display/remaining indicating button 41, and the visual search button 42 are disposed between the button group related to the playback and the button group related to the recording, for separating the both button groups, thereby improving ability of recognition in the button group related to the playback and the button group related to the recording, and further decreasing a possibility of misjudgment.

Figure 4:
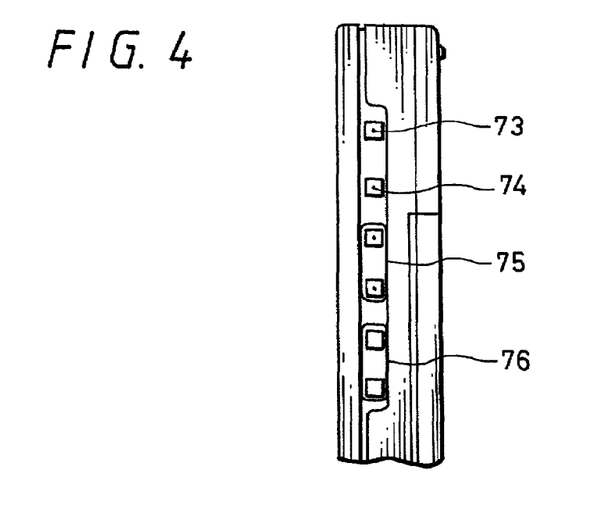
FIG. 4 is a partial broken side view of FIG. 3.

FIG. 4 shows the arrangement of the buttons for setting a TV, which are provided on the lateral side of the remote controller 30. There are provided a TV power switch 73 for turning on/off the power of a TV, an input switch button 74 for switching an input, a channel +/− button 75 for moving a channel, and a volume +/− button 76 for increasing and decreasing the volume.

Figure 5:
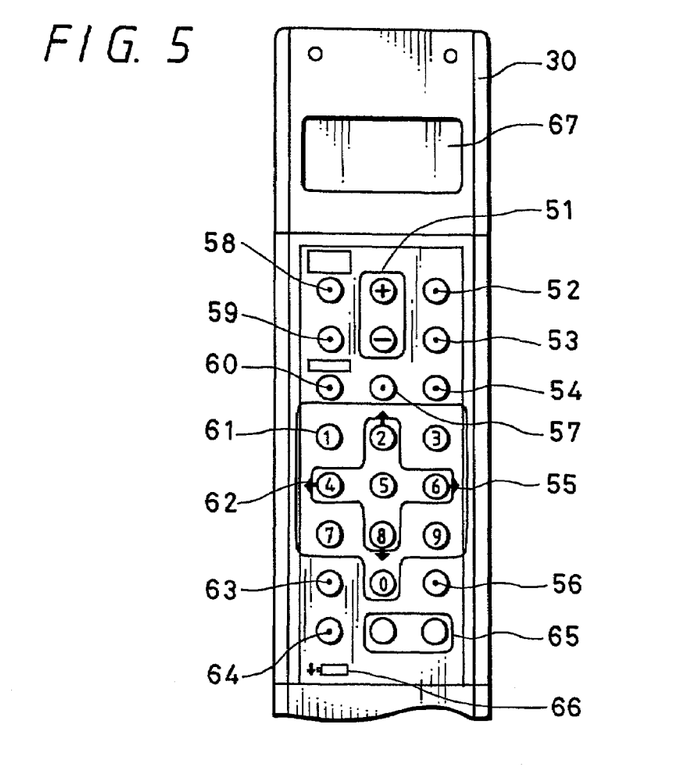
FIG. 5 is a partial broken bottom view showing the state of removing the rear cover of the button surface in FIG. 3.
Figure 6:
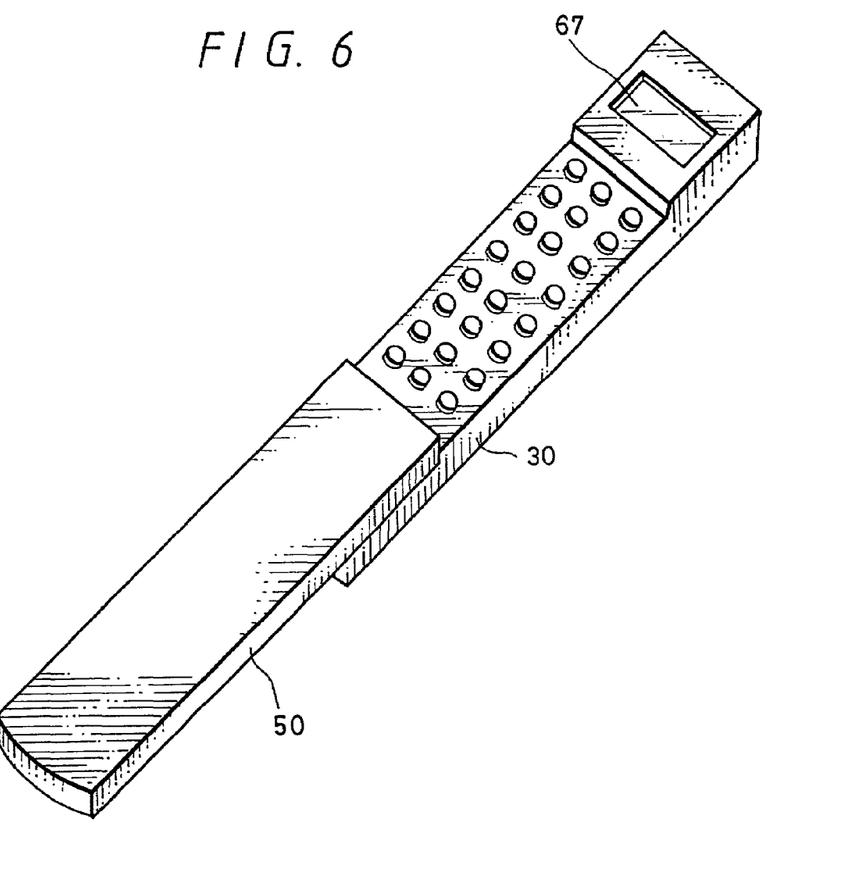
FIG. 6 is a perspective view showing the state of opening the rear cover of the bottom surface in FIG. 3.
Figure 7:
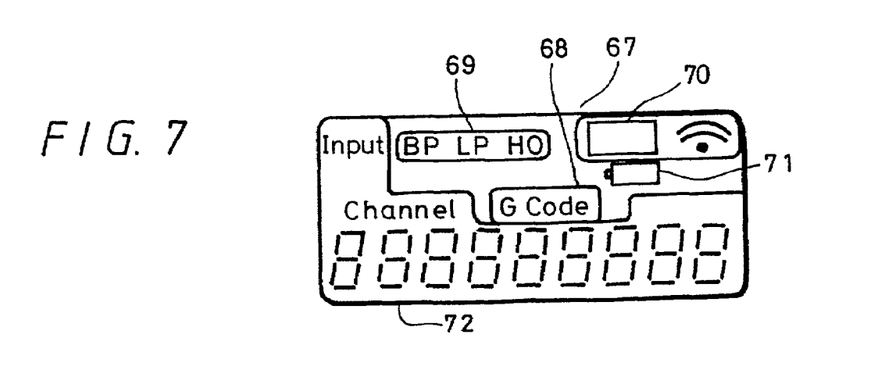
FIG. 7 is a plan view showing an example of display.

As illustrated in FIG. 6, if sliding a rear cover 50 of the remote controller 30 while pressing it, there appears a switch group 51 to 66 such as program setting and the like having been concealed by the rear cover 50, as shown in FIG. 5. A liquid crystal display 67 as shown in FIG. 7 is provided on the rear surface of the remote control, separately from the switch group 51 to 66 concealed by the rear cover 50. The playback and recording functions operated by the buttons (switches) disposed on the front surface of the remote control perform the actual playback and recording of the video signals through the tube face, whereas as for the functions disposed on the rear surface of the remote controller 30 buttons are disposed for the setting related to the timer recording and the G-code recording, which can be set without any display on the tube face. In the case of displaying the reproduced video signals and the recording screen on a TV monitor connected with the recording/reproducing apparatus, the setting content is displayed on the tube face.

The display unit of FIG. 7 displays a G-code, record mode, a channel to be recorded, recording time, the setting of a TV maker to be operated by the remote control, quick timer, battery consumption, and transfer.

Especially, the battery remaining indicator is necessary for finding the cause of being no operational at a setting time of the remote control, since the display unit is not provided on the recording apparatus itself.

As illustrated in FIG. 5, on the rear surface of the remote controller 30, there are a channel +/− button 51 for a built-in tuner, a transfer button 52 for transferring various settings to the main body, a record mode button 53, a cancel button 54 for canceling the settings, a numeric button 55 corresponding to the numerals from one to nine, a return/correction button 56 serving for moving a cursor and accepting correction at a time of setting, an input switch button 57 for switching an input, a quick timer button 58 for increasing the recording time by every 15 minutes, a sound switch button 59 for switching the sound at recording, a G-code program button 60 for programming by G-code, an image quality setting button 63 for setting the image quality, a remote control setting button 64 for switching a corresponding TV maker, an index write/cancel button 65 for setting cancellation and index writing for use in search for a recorded image, and a battery remaining indicator 66 for displaying the state of battery, and the above mentioned numeric button 55 serves as a set-up button 61 for use in displaying various settings on the tube face and a decision button 62 for instructing the decision of the moving direction of a cursor to the main body.

FIG. 4 shows the arrangement of the buttons for setting a TV, which are provided on the lateral side of the remote controller 30. There are provided a TV power switch 73 for turning on/off the power of a TV, an input switch button 74 for switching an input, a channel +/− button 75 for moving a channel, and a volume +/− button 76 for increasing and decreasing the volume.

As shown in FIGS. 3 to 5, in the remote controller 30 of the embodiment, the setting functions are divided on the front surface, the rear surface, and the lateral surface, respectively, for the main operation for use in recording and reproducing, the auxiliary operation for auxiliary use in recording and reproducing, and the TV operation. Additionally, the recording function and the playback function are provided on the same surface but separated at a distance, thereby preventing malfunction of operations to a degree. These are important functions in the recording/reproducing apparatus capable of simultaneously recording and reproducing.

Figure 8:
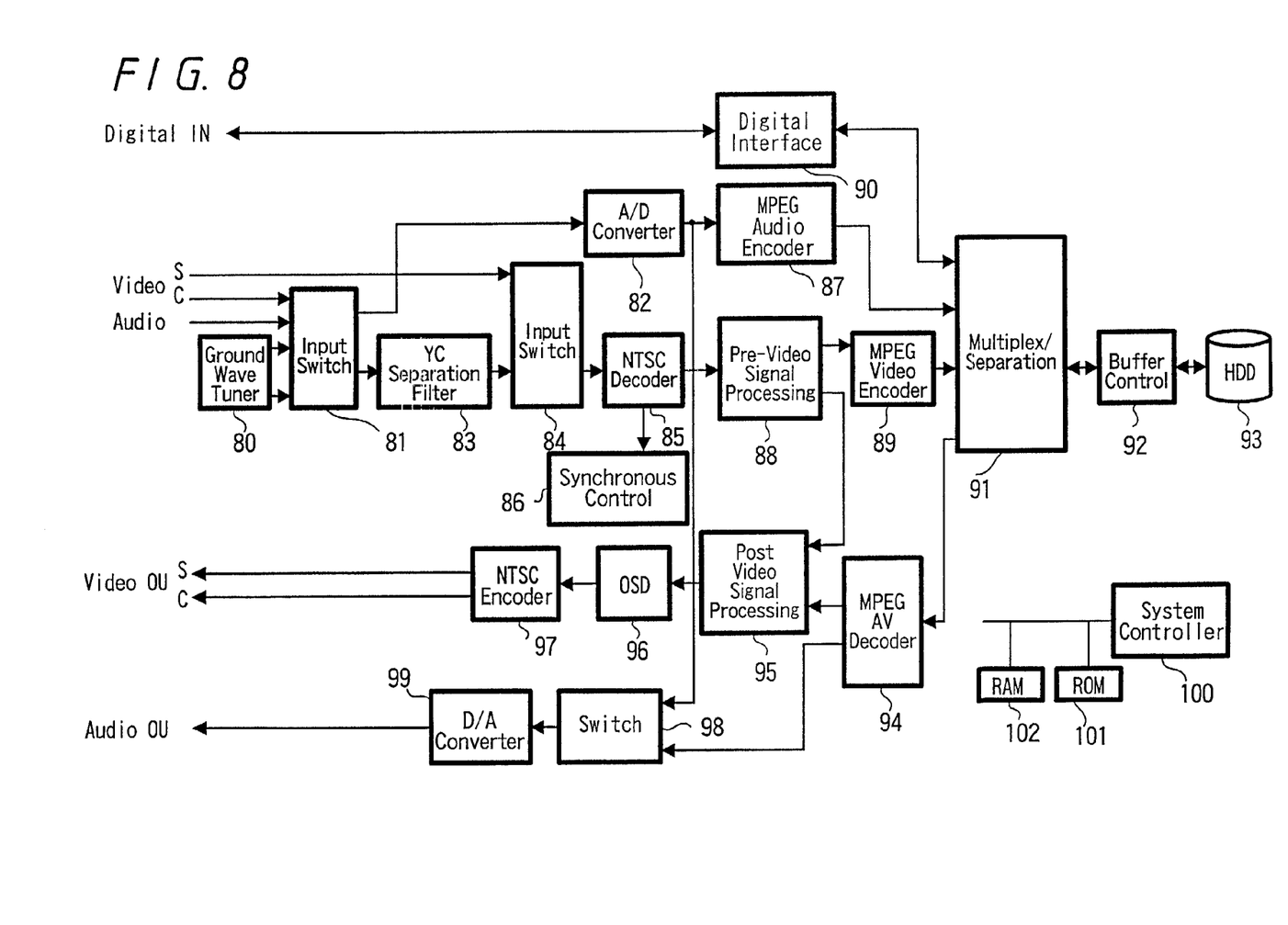
FIG. 8 is a block diagram showing an example of an embodiment of a video signal recording/reproducing apparatus of the present invention.

FIG. 8 shows a recording/reproducing circuit of the recording/reproducing apparatus itself 1 of the embodiment.

Video signals and audio signals entered through a ground wave tuner 80 are respectively supplied to an AD converter 82 and a YC separation filter 83 through a first input switch 81.

The YC separate luminance and color-difference signals are supplied to an NTSC decoder 85 through a second input circuit 84 switching signals from an outward input S terminal, and as for the synchronous component, the decoded signals are supplied to a synchronous control circuit 86 and as for the video component, to a pre-video signal processing circuit 88.

A part of the video signals subject to the pre-video signal processing is supplied to the reproducing circuit, for display of the recorded image, while it is supplied to an MPEG video encoder 89, for recording.

The NTSC decoder 85 extracts the broadcast schedule which a specified broadcast channel is delivered on a video signal, information relative to a program based on the schedule, and the time information thereof, so as to decode and transfer the same to the system controller 100. The time information is used for setting the current time after it is transferred to a timer within the system controller 100. The time information is used for programmed recording, based on the time within the timer and the broadcast schedule, within the system controller 100.

For example, the video recording/reproducing apparatus of the embodiment can judge the end time of video under the programmed recording actually, by comparison between the time of the timer and the broadcast schedule.

The broadcast schedule includes: a program code; the time relative to all the programs of ground wave broadcast and satellite broadcast BS and CS; a channel; the type of the ground wave broadcast or the satellite broadcast; and G code corresponding to a channel and title, and the information relative to a program includes: a program code corresponding to the broadcast schedule; title; brief extract from the content; the type code relative to a program; a performer; and special information. The type code (classification) indicating the content of each program, broadcast date, and title are used for rearrangement of each list in a program list display (list) as described later.

After the AD conversion, audio signals are supplied to the MPEG audio encoder 87, and combined with the output of the MPEG video encoder 89, they are multiplexed in a time sharing way and recorded. The time division multiplex and separate circuit 91 is connected to a bit stream input/output terminal 19 that is the outward digital interface input/output terminal, through a digital interface 90, in order to directly store the digital signals entered from the outward, in addition to the output of the MPEG video encoder 89 and the output of the MPEG audio encoder 87.

The system controller 100 records the information relative to a program to be recorded (identifying signal) into a specified area of the recording medium 93, in accordance with recording a video signal (program) into the recording medium (hard disk) 93, and the recorded information on the program is reproduced and supplied to an OSD circuit (only screen display circuit) 96, as described later, not only for use in various displays, but, for example, the recorded information is displayed in a list, and used for rearrangement on the list based on the information, thereby displaying the program in the order of rearrangement.

The information on a program to be recorded (identifying signal) includes not only a signal extracted from the broadcast wave such as the date relative to the broadcast schedule, title, and classification, but it may be an identifying signal indicating that the already-recorded program is not reproduced. When the volume of a recording medium becomes large, it becomes difficult to find a program that has not been reproduced yet, on the recording medium. Therefore, the above identifying signal is necessary in order to make this troublesome work easy.

For example, since the identifying signal helps to find a program that has not been reproduced and induces a user to confirm that, it is possible to delete the programs that once he or she has watched, from the recording medium, by one operation, after displaying the programs in a list.

In order to preserve a specified program from this one operational deletion, key information capable of rejecting the deletion can be set to each program, thereby setting a program that a user wants to preserve on a recording medium, with ease. Similarly, the programs with this key information set there are searched and displayed on a list, so as to induce a user to confirm whether a key should be set or released.

The time division multiplex and separate circuit 91 supplies the signals to a buffer control circuit 92 which performs input/output to and from a hard disk 93, so to store them into the hard disk 93.

The hard disk 93 is controlled by the buffer control circuit 92, and it can be replaced by an optical disk having the same structure. Assuming that the recording and playback speeds of video are respectively 10 Mbps, since a speedy optical disk works at a speed of 40 Mbps, the simultaneous recording and reproducing is possible in addition to the easy recording and reproducing, even if considering the time of retry.

The playback signals reproduced by the time division multiplex and separate circuit 91 are supplied to the MPEG AD encoder 94, where the video and audio signals are respectively decoded.

The MPEG AV decoder 94 switches between the output for tube face display from the pre-video signal processing unit 88 and the output of the MPEG AV decoder 94, or mixes them in a time sharing way, hence to supply the same to an OSD circuit 96.

The signals supplied from the OSD circuit 96 are decoded into signals that can be displayed by a TV for NTSC, by a TNTSC decoder 97, and thereafter, they become the signals that can be displayed on the screen. For example, the reproduced image and the image to be recorded can be displayed within respective windows on the same screen.

As in the case of the audio signals, signals for recording the audio signals and the output of the MPEG AV decoder 94 are supplied to a DA converter 99 through the switching circuit 98.

Since the digital signals entered from the outward are premised on the MPEG TS method, in the video signal recording/reproducing apparatus itself 1 of this embodiment, the audio and video signals, after their MPEG encoding, are not recorded and controlled separately but controlled by the recording medium according to the TS method.

Figure 9:
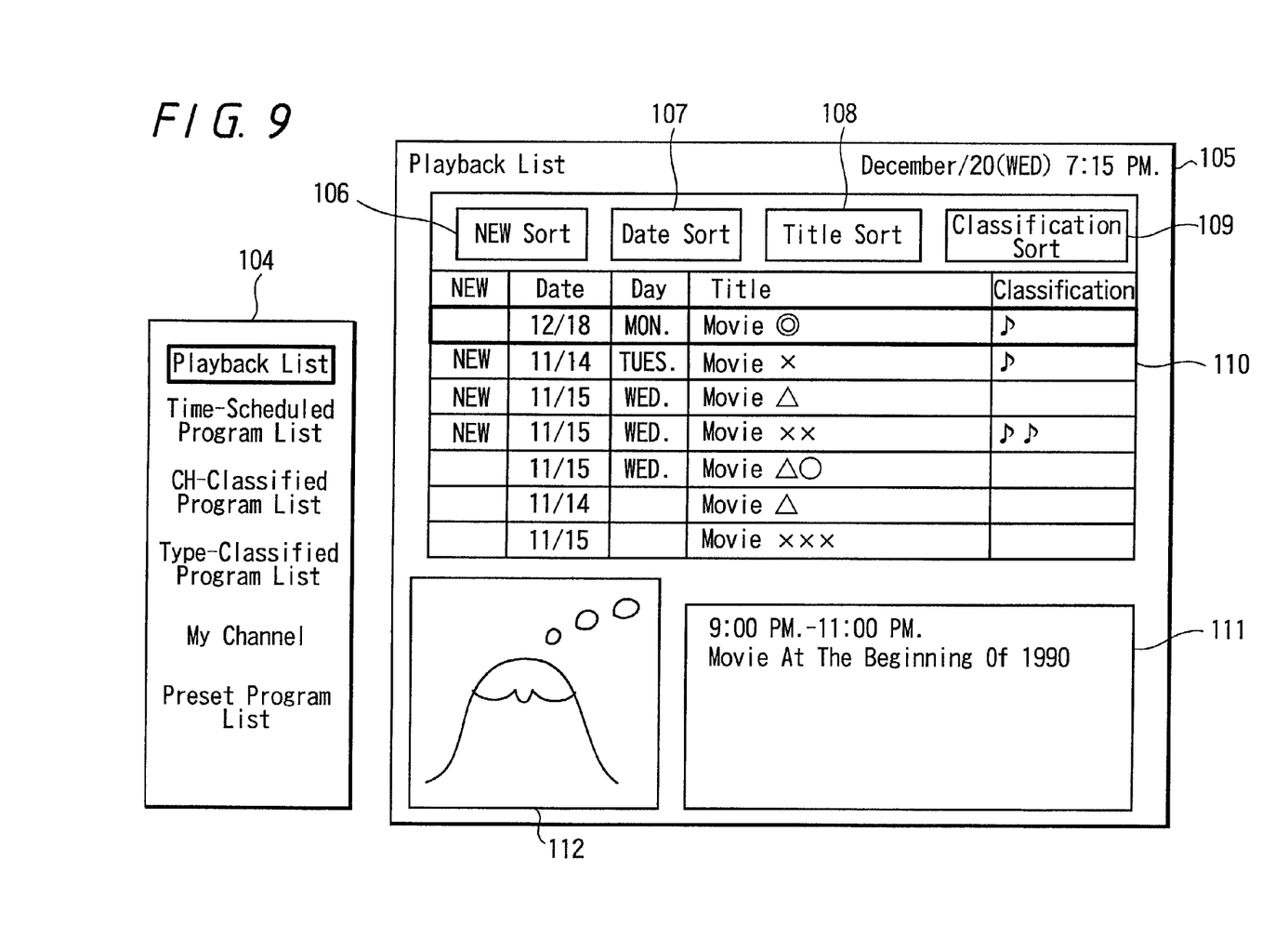
FIG. 9 is a diagram for use in describing the present invention.

FIG. 9 shows the playback title screen displayed on the screen of a TV in reproducing the video recorded by the video signal recording/reproducing apparatus itself 1 of the embodiment.

By pressing a list button on the front surface of the remote controller 30, the playback title screen can be displayed on the screen. In the displayed list 105, a playback list, a time-scheduled program list, a CH-classified program list, a type-classified program list, my channel, and a preset program list can be selected from a list menu displayed on the same screen.

The playback list is to display programs recorded in the recording/reproducing apparatus, and the respective program lists classified by time, CH, and type are a program schedule sent in a lump through a specified CH broadcast, which is broadcasted on a different channel from the programs, and lists created by editing the contents of the respective programs from the text and program classification.

Figure 10:
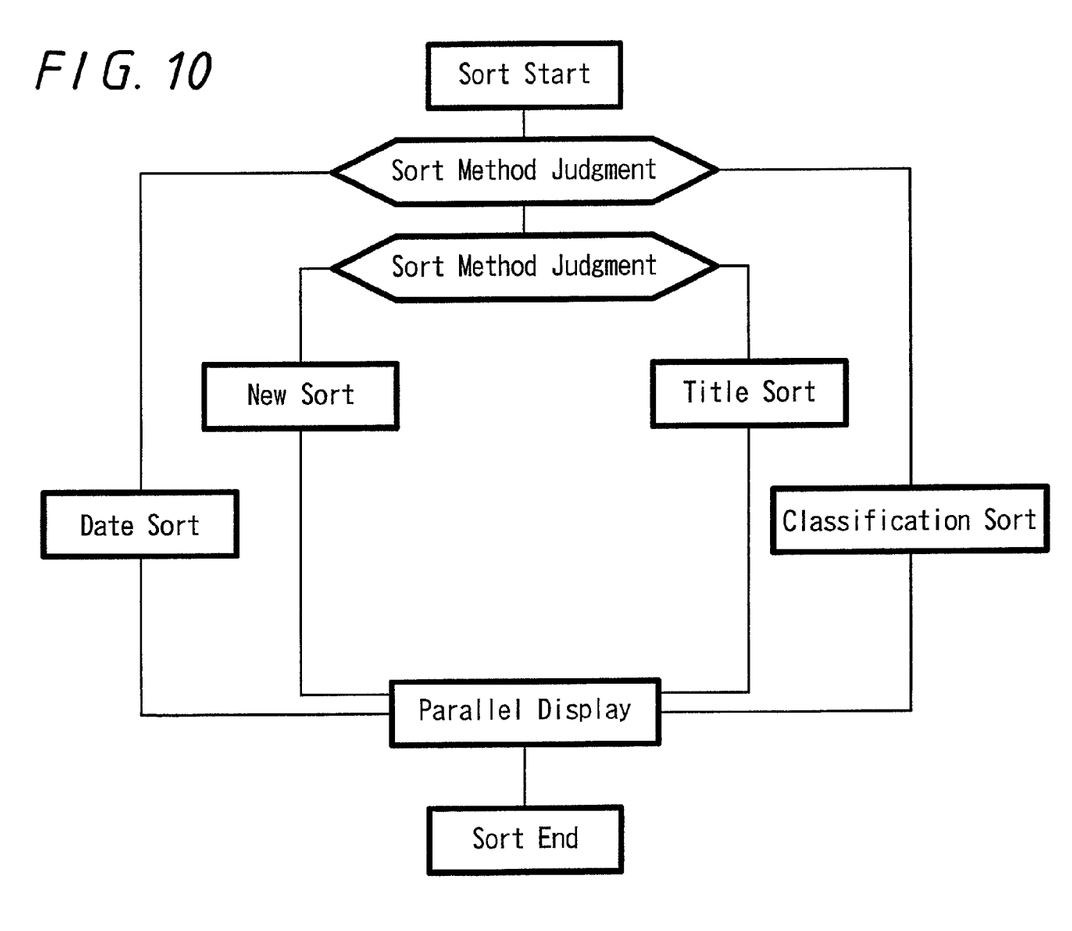
FIG. 10 is a diagram for use in describing the present invention.

My channel is to display a user's favorite classification and content by extracting it from the past record information and selecting it from the program schedule, text, and program classification. A list 105 shown in FIG. 9 is a playback list selected from the list selection and the list shows the selection buttons of NEW sort 106, date sort 107, title sort 108, and classification sort 109. By selecting one of these buttons while moving a cursor, the corresponding sort is selected and performed according to the flow as shown in FIG. 10.

Based on the data multiplexed in the broadcast program, various kinds of lists are displayed and sorted. Therefore, not only data error can be detected so that the data error can be corrected, but also, in accordance with the majority rule, an error may be judged by a majority of data sent in the past, so that the correct data may be extracted.

The NEW sort 106 is to sort the titles of the recorded images which have been automatically recorded by a timer in the video signal recording/reproducing apparatus 1 but yet to have been reproduced yet, in the order of recording. They can be sorted out also in the order of date, title, and index mark set by the remote control 30.

The sorted titles can be automatically reproduced by the playback, and further the beginnings of the recorded images for every one minute can be reproduced by turns by specifying the intro playback. The playback time of this intro playback can be varied freely by an instruction from the remote controller 30.

Pressing the menu button 38 of the remote control 30 can show a window on a list display with buttons (not illustrated) for various reproducing methods on the tube face. These buttons include a sequential playback button, intro playback button, skip playback button, and shuffle playback button.

The rearranged titles can be automatically reproduced by selecting the sequential playback button by a cursor on the tube face or pressing the playback button 47 of the remote control. Further, the beginning of each recorded video can be sequentially reproduced for every one minute by selecting the intro playback button by a cursor on the tube face to specify the intro playback. The reproducing time of this intro playback can be freely changed by increasing and decreasing the numeric displayed on the tube face according to an instruction from the remote control 30.

Since the thumbnail images are prepared correspondingly to the initial screens of the respective titles, after sorting the titles, the thumbnail display can be specified by once more pressing the list button 43 twice continuously, and the thumbnail images can be displayed in the order of the titles.

The video recording/reproducing apparatus of this embodiment adopts a recording medium by use of a hard disk or an optical disk, differently from the conventional tape recording/reproducing apparatus, for example, VTR, thereby enabling various kinds of playbacks. Further, since software for recording and reproducing is developed in consideration of the characteristic of a recording medium, the present invention can provide a user with more ease of use than the conventional apparatus.

The present invention is not restricted to the above mentioned embodiment, but needless to say, various structures can be adopted without apart from the spirit of the present According to the present invention, a video signal can be simultaneously recorded and reproduced and the playback of another video signal can be resumed at reproducing this simultaneously recorded and reproduced video signal and at completion of the playback thereof. Namely, since the software for recording and reproducing in consideration of the characteristic of a recording medium is developed, the present invention can provide a user with more ease of use that the conventional apparatus.

According to the present invention, because of separating a recording stop switch for stopping the recording and a playback stop switch for stopping the playback, an operator can operate the apparatus easily without making a mistake, in simultaneous recording and reproducing, even if displaying the above switches at once on the screen.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A recording/reproducing apparatus capable of simultaneously (a) recording video or audio into a recording medium and (b) reproducing the video or audio from the recording medium, comprising:

recording means for recording video or audio signals and identifying signals, indicating non-user generated content of the video or audio signals, into a recording medium;

list generating means for generating a title list of only not yet reproduced videos or audios recorded in the recording medium using said identifying signals to arrange the title list; and reproducing means for reproducing one or more videos or audios in the title list, wherein the reproducing means automatically sequentially reproduces part of each not yet reproduced video or audio in the title list upon user selection of an introduction playback mode.

2. The recording/reproducing apparatus according to claim 1, wherein the reproducing means sequentially reproduces, for a predetermined amount of time, a beginning part of videos or audios in the title list upon user selection of the introduction playback mode.

3. The recording/reproducing apparatus according to claim 1, further comprising:

receiving means for receiving a user indication of sorting the video or audio titles;

sorting means for sorting the titles in the title list in response to a received user indication; and providing means for providing the sorted title list to the user.

4. The recording/reproducing apparatus according to claim 3, wherein the sorting means sorts the video or audio titles in order of date, title, classification or recording in response to a received user indication.

5. The recording/reproducing apparatus according to claim 3, wherein the sorting means sorts the titles of the recorded video or audio that has been automatically recorded by a timer in the recording/reproducing apparatus that have not been reproduced, in the order of recording.

6. The recording/reproducing apparatus according to claim 3, wherein the providing means provides thumbnail images corresponding to the sorted titles.

7. A recording/reproducing method for simultaneously (a) recording video or audio into a recording medium and (b) reproducing the video or audio from the recording medium, comprising:

recording video or audio signals and identifying signals, indicating non-user generated content of the video or audio signals, into a recording medium;

generating a title list of only not yet reproduced videos and audios recorded in the recording medium using said identifying signals to arrange the title list; and reproducing one or more videos or audios in the title list, wherein upon user selection of an introduction playback mode, automatically sequentially reproducing part of each not yet reproduced video or audio in the title list.

8. The recording/reproducing method according to claim 7, wherein the reproducing step sequentially reproduces, for a predetermined amount of time, a beginning part of videos or audios in the title list upon user selection of the introduction playback mode.

9. The recording/reproducing method according to claim 8, further comprising:

receiving a user indication of sorting the video and audio titles;

sorting the titles in the title list in response to a received user indication; and providing the sorted title list to the user.

10. The recording/reproducing method according to claim 9, wherein the providing step provides thumbnail images corresponding to the sorted titles.

11. The recording/reproducing method according to claim 9, wherein the sorting step sorts the video or audio titles in order of date, title, classification or recording in response to a received user indication.

12. The recording/reproducing method according to claim 9, wherein the sorting step sorts the titles of the recorded video or audio that has been automatically recorded by a timer that have not been reproduced, in the order of recording.

* * * * *

UNITED STATES PATENT AND TRADEMARK OFFICE
CERTIFICATE OF CORRECTION

PATENT NO. : 7,623,757 B2
APPLICATION NO. : 09/905063
DATED : November 24, 2009
INVENTOR(S) : Watanabe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1930 days.

Signed and Sealed this

Twenty-sixth Day of October, 2010

David J. Kappos
*Director of the United States Patent and Trademark Office*